United States Patent [19]
Larner et al.

[11] Patent Number: 5,129,072
[45] Date of Patent: Jul. 7, 1992

[54] SYSTEM FOR MINIMIZING INITIATOR PROCESSOR INTERRUPTS BY PROTOCOL CONTROLLER IN A COMPUTER BUS SYSTEM

[75] Inventors: Joel B. Larner, Fort Collins, Colo.; Michael B. Jacobson, Boise, Id.; Elen S. Hunt, Greeley, Colo.; Wendell D. Martin, Boise, Id.

[73] Assignee: Hewlett-Packard Company, Palo Alto, Calif.

[21] Appl. No.: 320,685

[22] Filed: Mar. 8, 1989

[51] Int. Cl.⁵ .............................. G06E 13/24
[52] U.S. Cl. ............................ 395/425; 364/DIG. 1
[58] Field of Search ... 364/900 MS File, 200 MS File; 370/64, 90

[56] References Cited

U.S. PATENT DOCUMENTS

| | | | |
|---|---|---|---|
| 4,393,445 | 7/1983 | Milligan et al. | 364/200 |
| 4,443,850 | 4/1984 | Harris | 364/200 |
| 4,561,051 | 12/1985 | Rodman et al. | 364/200 |
| 4,602,327 | 7/1986 | LaViolette et al. | 364/200 |
| 4,644,463 | 2/1987 | Hotchkin et al. | 364/200 |
| 4,754,399 | 6/1988 | Yamamoto et al. | 364/200 |
| 4,783,730 | 11/1988 | Fischer | 364/200 |
| 4,812,973 | 3/1989 | Kinoshita | 364/200 |
| 4,823,312 | 4/1989 | Michael et al. | 364/900 |
| 4,864,532 | 9/1989 | Reeve et al. | 364/900 |
| 4,864,533 | 9/1989 | Hanada | 364/900 |

Primary Examiner—Stuart N. Hecker
Assistant Examiner—Reba I. Elmore
Attorney, Agent, or Firm—William W. Cochran, II

[57] ABSTRACT

In a computer system employing a common bus that is shared by an initiator and a plurality of targets, there is provided a method and apparatus that prevents data stored in a buffer, when one of the targets temporarily suspends a data transfer with the initiator, from being overwritten, while simultaneously minimizing the number of interrupts that must be employed to effect the data transfer. According to the disclosed invention, the initiator is interrupted by a second target only after the transfer of data from the initiator to a first target has been temporarily suspended, and only after the second target has reselected the bus. After the second target has reselected the bus, data read from the second target and transferred to the initiator is stored in a synchronous stack in the initiator to prevent any data remaining in the buffer from being overwritten. Data stored in the buffer is then stored in a predetermined location, such as RAM, in the initiator so that the data stored in the synchronous stack can be transferred to the buffer without loss of data.

16 Claims, 8 Drawing Sheets

SYSTEM FOR MINIMIZING INITIATOR PROCESSOR INTERRUPTS BY PROTOCOL CONTROLLER IN A COMPUTER BUS SYSTEM

BACKGROUND OF THE INVENTION

A. Field of Invention

The present invention pertains generally to computer bus systems and more specifically to computer bus systems which allow host computers, otherwise referred to as initiators, to communicate with various peripheral storage devices, such as disc drives and tape drives, which are otherwise referred to as targets.

B. Description of Background

Computer bus systems control the flow of information between the various components that are connected to the system. This information can comprise data, commands, and messages. Computer bus systems normally utilize a standardized protocol which sets forth a predetermined set of rules for controlling the flow of information on the bus. One such protocol is the Small Computer Systems Interface (SCSI) protocol which has been adopted widely in the personal computing industry. The SCSI protocol has a very complete set of rules for controlling the flow of information on the bus. Each component, i.e., each initiator and each target, has a controller which functions as an interface unit between the component (i.e., the target or initiator) and the bus. The present invention pertains to a system that can be implemented as a initiator controller on a SCSI bus system.

Prior art initiator controllers, especially for SCSI protocol busses, operate with numerous interrupts of the initiator microprocessor. For example, some prior art initiator controllers require interrupts to prepare for "Selection", to prepare for "Message-Out" and to prepare for a "Command" when the initiator selects a target and sends a command, to prepare for a "Message-In" when a target sends a disconnect signal, to prepare for "Message-In" when a target reselects, to "Prepare for Data" when a first target transfers data in or out, to prepare for a "Message-In" when a target sends "Save Pointers" and "Disconnect" messages, to prepare for "Status" and "Message-In" when a target sends "Status" and "Command Complete." It is possible for all of these interrupts to be handled in an automated fashion, without interrupting the microprocessor and holding the bus idle while the microprocessor processes the information. Elimination of interrupts, in this fashion, would greatly decrease the overall response time of the computer system, especially for virtual memory systems where frequent access must be made to stored data.

A significant problem that is encountered in minimizing Initiator Processor interrupts for an Initiator Controller is the result of the fact that the Target Controller controls the bus phases after selection by the Initiator. As a result, the Initiator must be ready for various occurrences to take place after the target has been selected. The specific case which is somewhat programmatical is the situation where a first Target (Target A) decides to stop receiving data (Write data) from the Initiator, releases the bus, and second Target (Target B) reselects and starts sending data (Read data) to the Initiator. In that instance, Write data that was being sent by the Initiator Controller to Target A is left resident in a first-in first-out (FIFO) device in the Initiator Controller and Read data being received by the FIFO of the Initiator Controller from Target B overwrites the Write data that was left in the FIFO to be sent to Target A. In some instances, the Write data that was lost in this manner can be retrieved by backing up the tape or readdressing the disc system to read the data again when Target A reselects. However, this may take a considerable amount of time, and, consequently, substantially increase the overall response time of the system. Moreover, in many instances such as the use of certain streaming tape drives, such as the HP88780 streaming tape drive, the data cannot be reaccessed and is lost.

An alternative to reaccessing the data on the tape or disc is to produce a processor interrupt whenever Target A disconnects from the bus while receiving Write data and Target B reselects. However, whenever Target B reselects in this situation it does not always send data but may, instead, send Status or Command signals to the Initiator. If Command or Status signals were to be sent by Target B in this instance, processor interrupts would not be required to prevent the overwriting of data in the FIFO and, hence, an unnecessary processor interrupt would be introduced into the system.

SUMMARY OF THE INVENTION

The present invention overcomes the disadvantages and limitations of the prior art by providing a process for minimizing processor interrupts in an initiator by an initiator protocol controller by automatically sequencing through transaction states of the bus until a transfer of data to a first target is temporarily suspended and a second target reselects. The initiator processor is then interrupted only after the transfer of Write data to a first target is temporarily suspended and a second target reselects and transitions to a Data-In state. The Read data from the second target is stored in a synchronous stack register in the protocol controller of the initiator to prevent the Write data in the FIFO from being overwritten. Write data stored in FIFO is then stored in a predetermined location in the initiator and Read data stored in the synchronous stack register is transferred to the FIFO so that the process can proceed in a normal fashion.

Storage of data in the manner described above is accomplished through a data storage system which prevents the loss of data in a protocol controller for an Initiator in a computer bus system that includes a FIFO storage system for storing the Write data to be transmitted by the protocol controller to a first target, a synchronous stack storage device for storing Read data that is received by the initiator protocol controller from the second target after the first target disconnects from the computer bus system prior to completion of transmission of the write data to the first target, logic devices that are responsive to logic control signals that transmit Write data to the FIFO storage, for transmitting Read data to the synchronous stack storage device that is received by the initiator protocol controller from the second target after the first target disconnects from the computer bus prior to completion of transmission of the Write data to the first target, and for transferring Read data stored in the synchronous stack to the FIFO after the Write data is read from the FIFO.

Additionally, a command/message (C/M) buffer is incorporated in the system to allow the initiator controller to receive Status signals from as many as seven targets in an automated fashion and execute the commands and messages during the normal queues of the initiator microprocessor to prevent initiator microprocessor interrupts. Hence, the present invention can automatically sequence to a Status state, without a initiator microprocessor interrupt, even though a second target has reselected after a first target temporarily releases the bus during a Write data sequence to the first target. In this manner, the present invention minimizes the initiator microprocessor interrupts and greatly reduces the overall response time of the system through the use of a synchronous stack storage device and a command/message buffer.

BRIEF DESCRIPTION OF THE DRAWINGS

FIG. 6 illustrates the preferred performance path of the initiator controller of the present invention.

DETAILED DESCRIPTION OF THE PRESENT INVENTION

Figure 1:
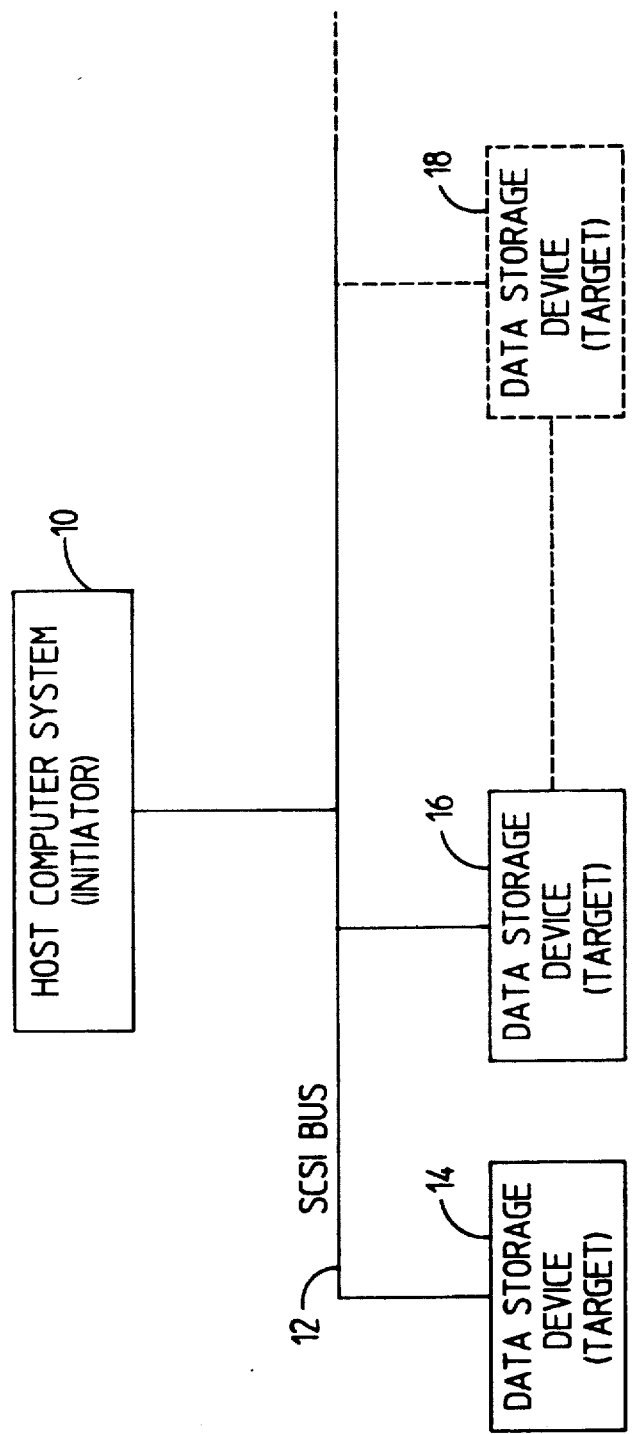
FIG. 1 is a schematic block diagram illustrating the bus system and components connected to the bus system in which the present invention is utilized.

FIG. 1 discloses the overall system environment in which the present invention is utilized. As illustrated in FIG. 1, a host computer system 10, which will also be referred to as an initiator 10, is connected through a computer bus, such as SCSI Bus 12, to various data storage devices 14, 16 and 18, which are otherwise referred to as targets 14, 16 and 18, respectively. The SCSI bus 12 functions as the system for providing a communication channel between the initiator 10 and targets 14, 16, 18. The initiator 10, as well as the targets 14, 16, 18 contain controllers for controlling the flow of information on the bus.

Generally, the initiator 10, as shown in FIG. 1, initiates the selection protocol by selecting a target to either send or receive data. The target, on the other hand, once it is selected, takes control of the bus so that command signals can be sent from the host. Control of the bus is established by configuring the phase lines of the bus. A target can normally disconnect from the bus and reselect independently of the initiator 10 in a SCSI bus system. Either the same target or a different target can reselect and send commands, messages, or data to the initiator 10, and the initiator 10 must be prepared to receive this information. Thus, the process of automating the initiator controller is difficult because the initiator cannot control which target may reselect and what information that target will be sending.

Figure 2:
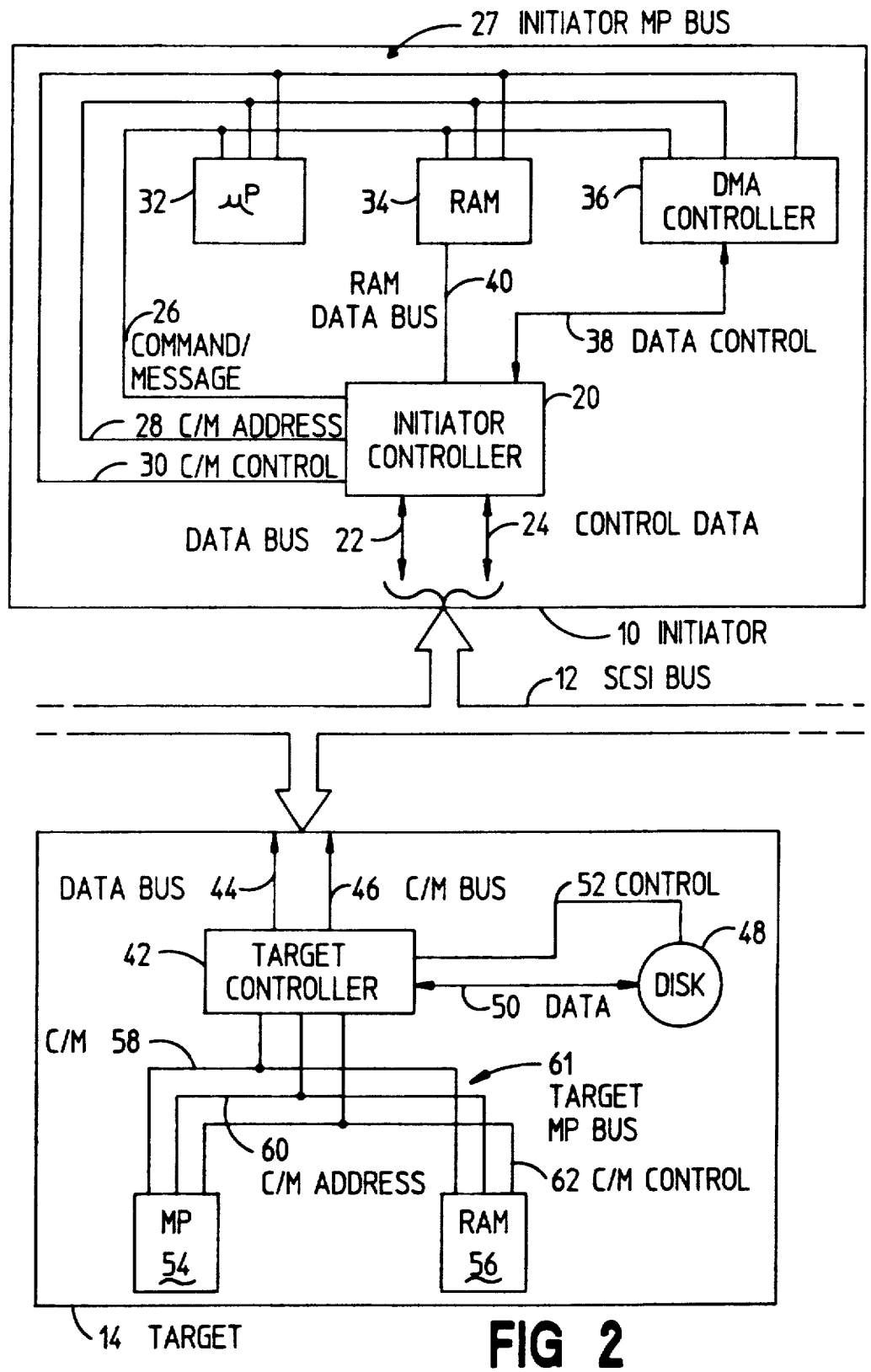
FIG. 2 is a block diagram of the initiator controller of the present invention as employed in an initiator and as connected to targets through a SCSI bus system.

FIG. 2 is a block diagram illustrating components of initiator 10 as well as data storage device (target) 14. As shown in FIG. 2, initiator 10 includes an initiator SCSI controller 20 that comprises the interface between the initiator 10 and the SCSI bus 12. For purposes of simplicity, in the initiator 10, the SCSI bus is divided into a data bus 22 which comprises strictly data lines and control lines 24 which carry all of the control signals. The initiator controller 20 has a command/message line 26 which carries command/message data, a command/message address line 28 and a command/message control line 30 which communicate address and control information, respectively. Each of these command/message lines is coupled to microprocessor 32, RAM 34 and DMA controller 36 and forms a part of the initiator microprocessor bus 27. DMA controller 36 is coupled to the initiator controller 20 by way of data control line 38. Data is transferred to and from the initiator controller 20 via data line 40 in response to control signals from the DMA controller 36 and data control line 38.

FIG. 2 also illustrates the manner in which target 14 is arranged and coupled to the SCSI bus 12. As shown in FIG. 2, target SCSI controller 42 has a data bus 44 which is coupled to the data lines of the SCSI bus 12, and a control bus 46 which is coupled to the control lines of SCSI bus 12. The target controller 42 is coupled to a storage disk 48 that stores and transmits data via data line 50. Control 52 controls the storage of data on disk 48 in response to control signals that are generated by target SCSI controller 42. The target microprocessor 54 and RAM 56 are also coupled to the target SCSI controller by way of a command/message data bus 58, a command/message address bus 60 and a command/message control bus 62 that form the target microprocessor bus 61. Target microprocessor 54 processes the command/message information provided by target microprocessor bus 61 in association with data stored in RAM 56.

Figure 3:
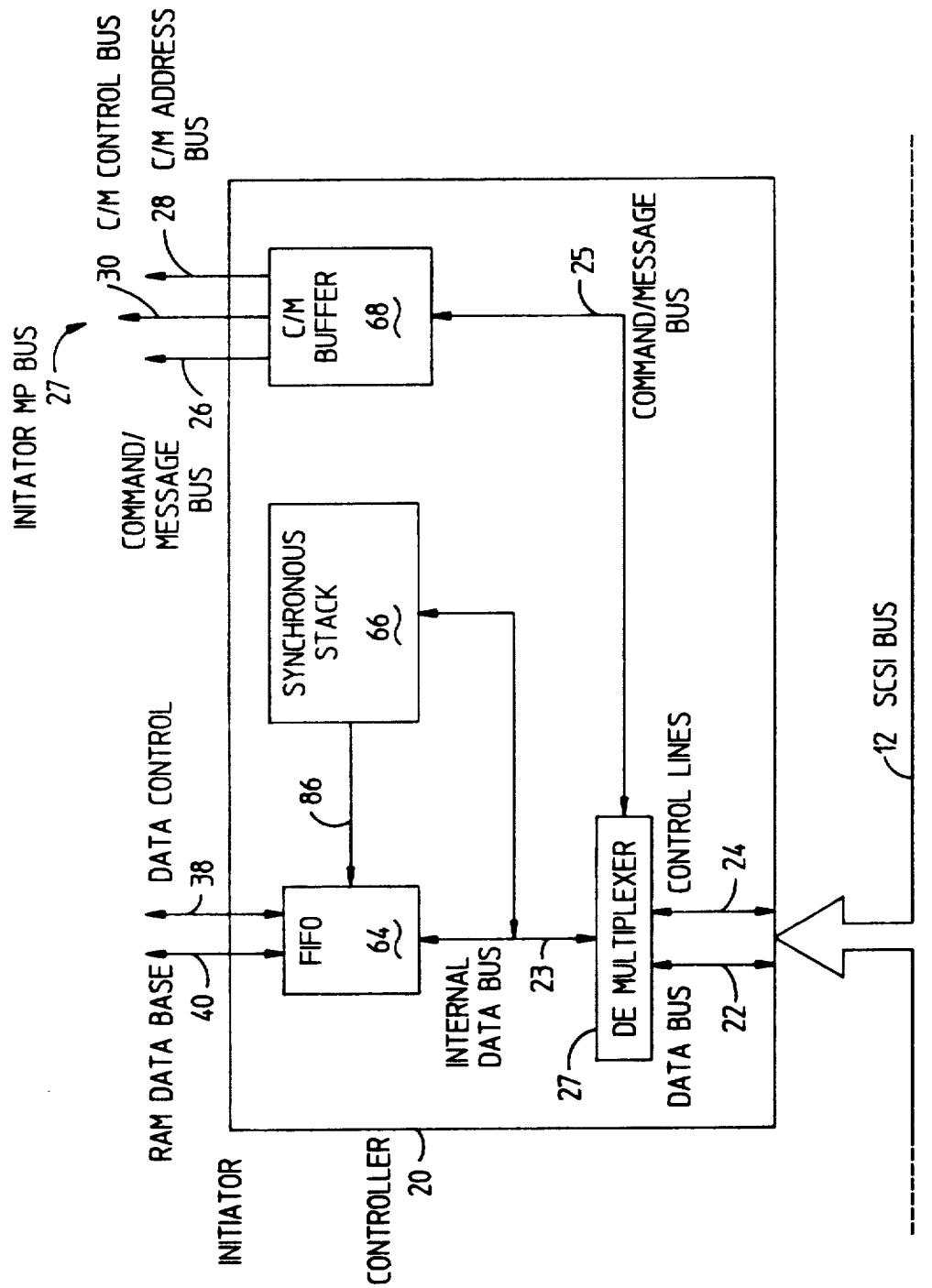
FIG. 3 is a detailed block diagram of the initiator controller.

FIG. 3 is a detailed schematic block diagram of the initiator SCSI controller 20 that is illustrated in FIG. 2. SCSI bus 12 is coupled to the initiator SCSI controller 20 so that the data bus lines 22 and control lines 24 are connected to demultiplexer 27. Demultiplexer 27 functions to demultiplex the information on data bus 22 in accordance with the control information on control lines 24 to separate data from commands and messages. Data is transmitted to FIFO 64 and Synchronous stack 66 on internal data bus 23. Commands and messages are transmitted from demultiplexer 27 on command/message bus 25 to command/message buffer 68. FIFO 64 is connected to RAM 34 (FIG. 2) by way of RAM data bus 40 and is connected to DMA controller 36 (FIG. 2) by way of data control line 38. C/M buffer 68 is coupled to microprocessor 32, RAM 34 and DMA controller 36 by way of command/message bus 26, command/message address bus 28 and command/message control bus 30, that form a part of the initiator microprocessor bus 27, as illustrated in both FIGS. 3 and 2.

In operation, FIFO 64 works as a temporary storage for the flow of data to and from RAM 34 (FIG. 2). Synchronous stack 66 and command/message buffer 68 comprise the key devices of the present invention which allow the initiator controller 20 to sequence through the various transaction states of the bus without the necessity of interrupting the microprocessor 32 (FIG. 2). Synchronous stack 66 stores data received from a second target, such as data storage device 16 (figure 1), after a first target, such as data storage device 14 (FIG. 1), has disconnected from the bus temporarily during the process of writing data to the first target. This causes Write Data to be left in FIFO 64. When the second target reselects and starts sending Read Data to the initiator controller 20, it would otherwise overwrite the Write Data in FIFO 64 and erase it. As disclosed in the description of FIG. 4 below, synchronous stack 66 functions to store the Read Data from the second target, while microprocessor 32 (FIG. 2) determines a way of retaining the data in FIFO 64 so that it is not lost. Typically, this occurs in one of three different ways. One way the microprocessor retains the data in FIFO 64 is to retrieve the data from FIFO 64 and store it in RAM 34 (FIG. 2). A second way is to cause the DMA controller 36 (FIG. 2) to reverse the flow of data from FIFO 64 to cause the data to be restored in RAM 34 at a previous location. A third way is for the microprocessor to determine the amount of data that is left in FIFO 64 and to reset the pointers in RAM 34 so that when the DMA controller 36 (FIG. 2) directs RAM 34 (FIG. 2) to initiate the transmission of data to target 14, the data to be sent will be initialized to the last data that was left in FIFO 64. Hence, the only preplanned interrupt occurs when a first target disconnects from the bus during a data transfer sequence and a second target reselects and wishes to transfer data to the initiator controller 20.

C/M buffer 68 also assists in the automatic sequencing of the various transaction states of the bus. C/M buffer 68 is capable of accepting and storing up to 7 status messages which are then processed and executed by microprocessor 32 (FIG. 2) in its normal queue. Hence, commands and messages can be processed by the microprocessor 32 (FIG. 2) without holding the bus idle which would greatly delay the overall response time of the system.

Figure 4:
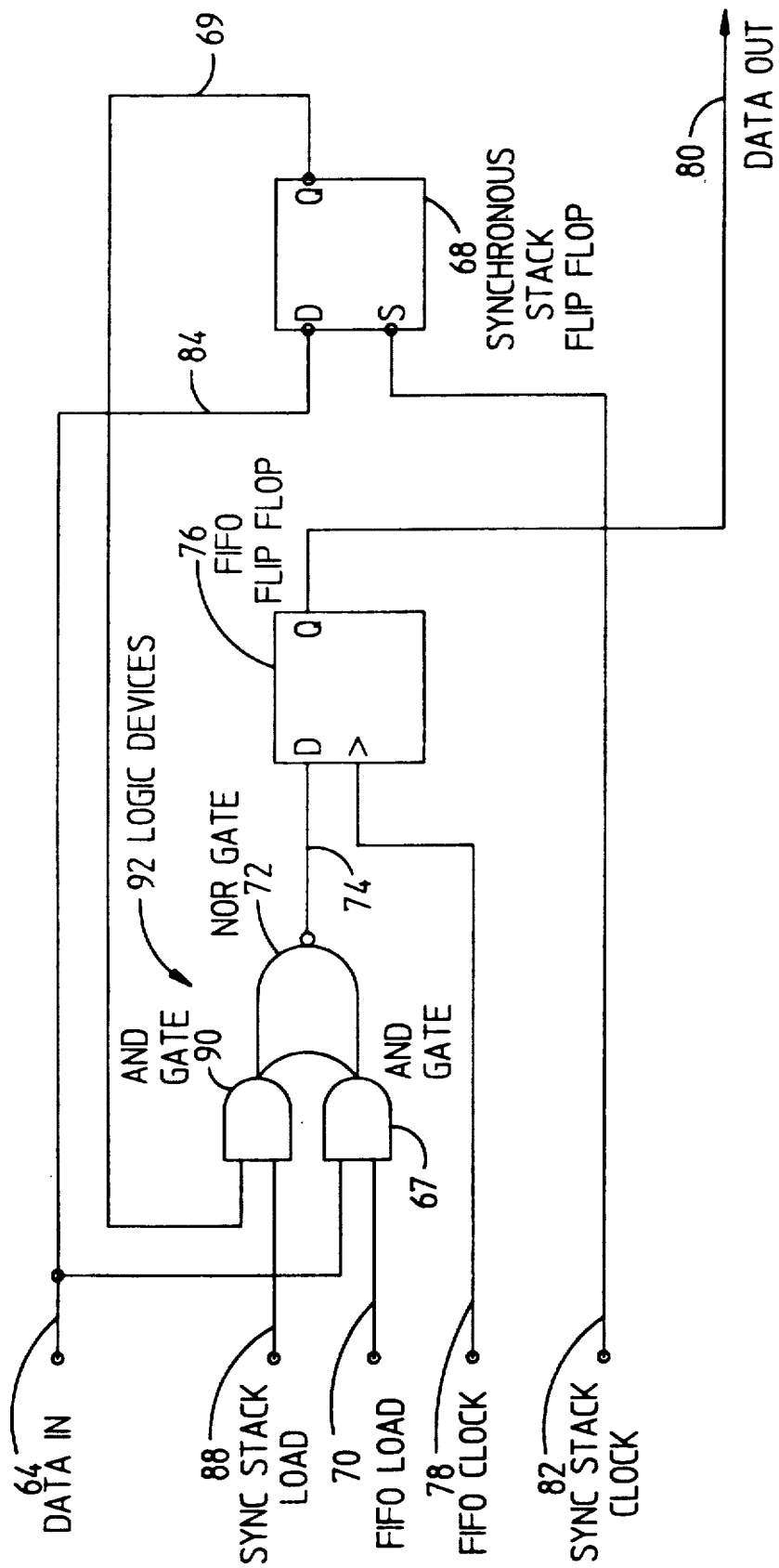
FIG. 4 is a schematic block diagram of a single cell of the synchronous stack register of the present invention.

FIG. 4 is a schematic diagram of a single cell of the FIFO 64 and synchronous stack 66. As shown in FIG. 4, data is received at the data-in port 65 and channeled to AND gate 67 and synchronous stack flip-flop 68. During normal operation, FIFO load input 70 to AND gate 67 is activated and the data at input port 64 is applied to NOR gate 72. The output of NOR gate 72 is applied to the data input 74 of the FIFO flip-flop 76. FIFO clock 78 functions to clock the data-in at data input port 74 and clock the data stored in FIFO flip flop 76 to the data-out port 80. If it is determined, as described above, that the data must be stored temporarily in the synchronous stack register, which comprises the series of synchronous stack flip-flops 68 of the multiple cells of the device of FIG. 4, the following sequence of events occurs. First, sync stack clock 82 clocks data from the data-in port 65 into the data input 84 of the synchronous stack flip flop 68. Each one of the cells of the device of FIG. 4 is capable of storing a single bit of data that is received at the data-in port 65. Each of the cells illustrated in FIG. 4 is nine cells wide in the bit direction and seven cells deep in the byte direction. Hence, up to 7 bytes of data can be stored in the synchronous stack register comprising the synchronous stack flip-flop 68 by clocking the data using synchronous stack clock 82 into the synchronous stack flip-flop 68. The data that is stored in the synchronous stack 66 is written to the FIFO 64, as illustrated in FIG. 3, by way of connector 86. As shown in FIG. 4, this occurs by applying a signal to sync stack load input 88 so that the data stored in synchronous stack flip-flop 68 that appears at the Q output 69 is ANDED by AND gate 90. This data is then applied to NOR gate 72 which, in turn, applies the data to data input 74 of the FIFO flip flop 76 when the flip-flop clock input 78 is strobed and therefore applied to the data output port 80. Hence, the logic devices 92, which comprise AND gate 90, AND gate 67, and NOR gate 72, either apply data from the data input ports 64 to the FIFO flip flop 76, or apply data from the synchronous stack 68 to the FIFO flip-flop 76 in response to the sync stack load signal 88 and FIFO load signal 70.

Figure 8:
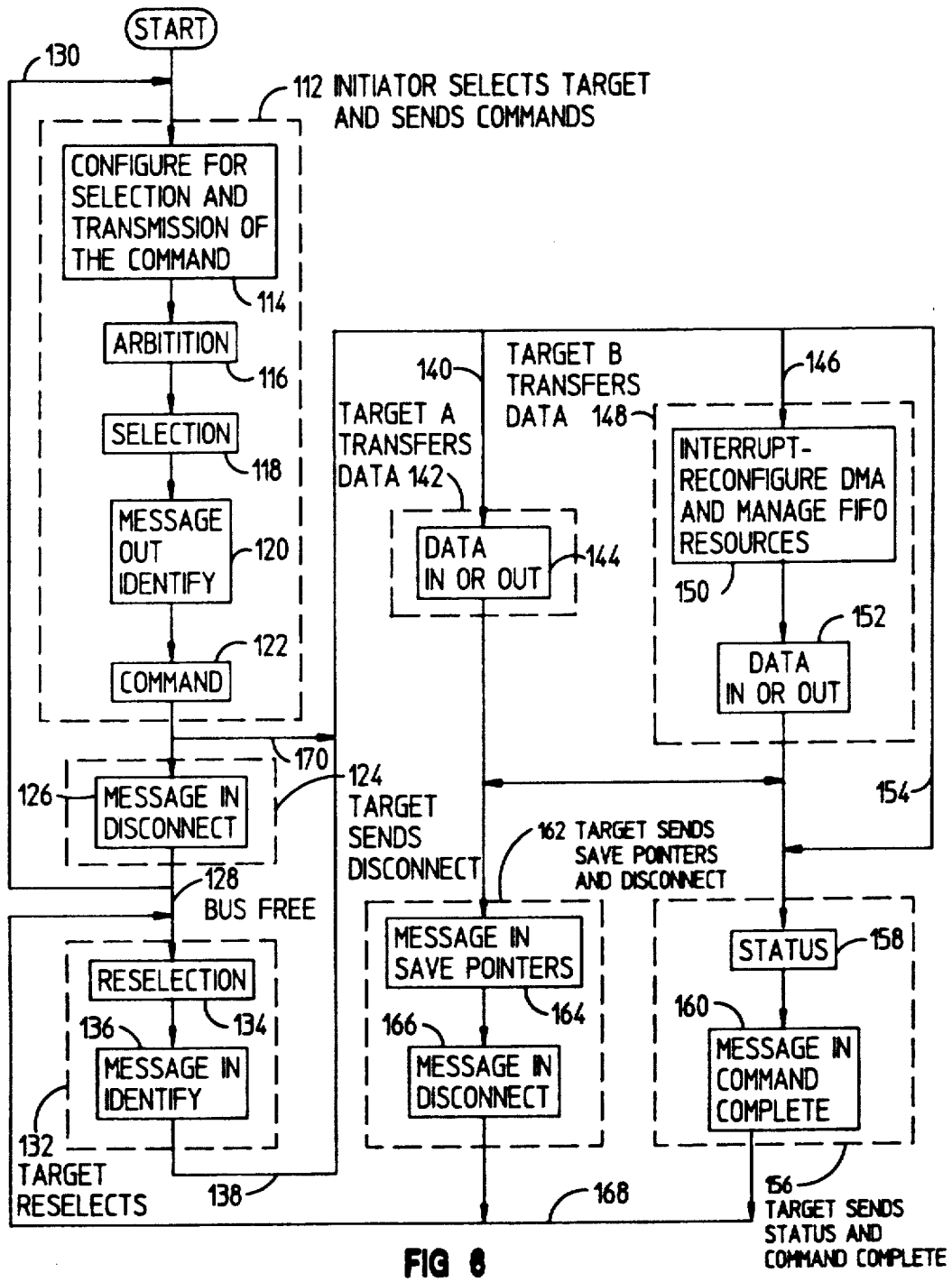
FIG. 8 is a logic flow diagram of the decisional processes of the initiator controller of the present invention.

Sync stack clock 82, as well as the complimentary sync stack load signal 88 and FIFO load signal 70, are activated in response to a simple logic circuit that is described in FIG. 8 that compares the address of the target which the initiator controller 20 has been configured to transfer data automatically with the address of the target that reselected. If these do not match and the target that reselected wishes to send read data to the initiator controller 20 (FIG. 3), then the sync stack clock 82 is activated to read the data at data input port 65 to the sync stack flip flop 68. After the data which has been left resident in FIFO 64 has been stored in RAM by the microprocessor 32 (FIG. 2), data from the synchronous stack flip flop 68 overwrites the data in FIFO flip flop 76.

The synchronous stack 66 (FIG. 3) is constructed as described above, so that it is capable of storing 7 bytes of Read data from the second target. To have effective high speed communication of data on the SCSI bus, it is important that the data be able to be transmitted in a high speed synchronous manner. For each bit of data that is received by the initiator controller 20 (FIG. 3), an acknowledge signal must be transmitted to the target to acknowledge its receipt. The initiator controller 20 can negotiate with the target to allow a certain number of bytes of data to be transmitted before the acknowledge signal for the first bit of data is received by the target. For example, the initiator controller may negotiate with the target to send 7 bytes of data before terminating the transmission of data if an acknowledge signal is not received. This allows the initiator controller 20 to continue to receive data in a high speed synchronous manner and send acknowledge signals for each byte so long as the delay does not exceed 7 bytes of data. If the delay between the receipt of a byte by the initiator controller 20 and receipt of the acknowledge signal by the target equals the number of bytes that the initiator controller has negotiated with the target, the target ceases sending data and waits for the acknowledge signal from the initiator controller 20. In most instances, with the SCSI bus system of the present invention, the delay is no longer than several bytes and always shorter than 7 bytes. Hence, the synchronous stack 66 can store the negotiated number of 7 bytes that are sent by the second target before it automatically ceases sending data. Hence, the synchronous stack 66 allows the system to transmit data synchronously without any loss of data because of the fact that it is capable of temporarily storing at least 7 bytes of data which is a sufficient amount to insure that high speed of the data transmission can be maintained.

Figure 5:
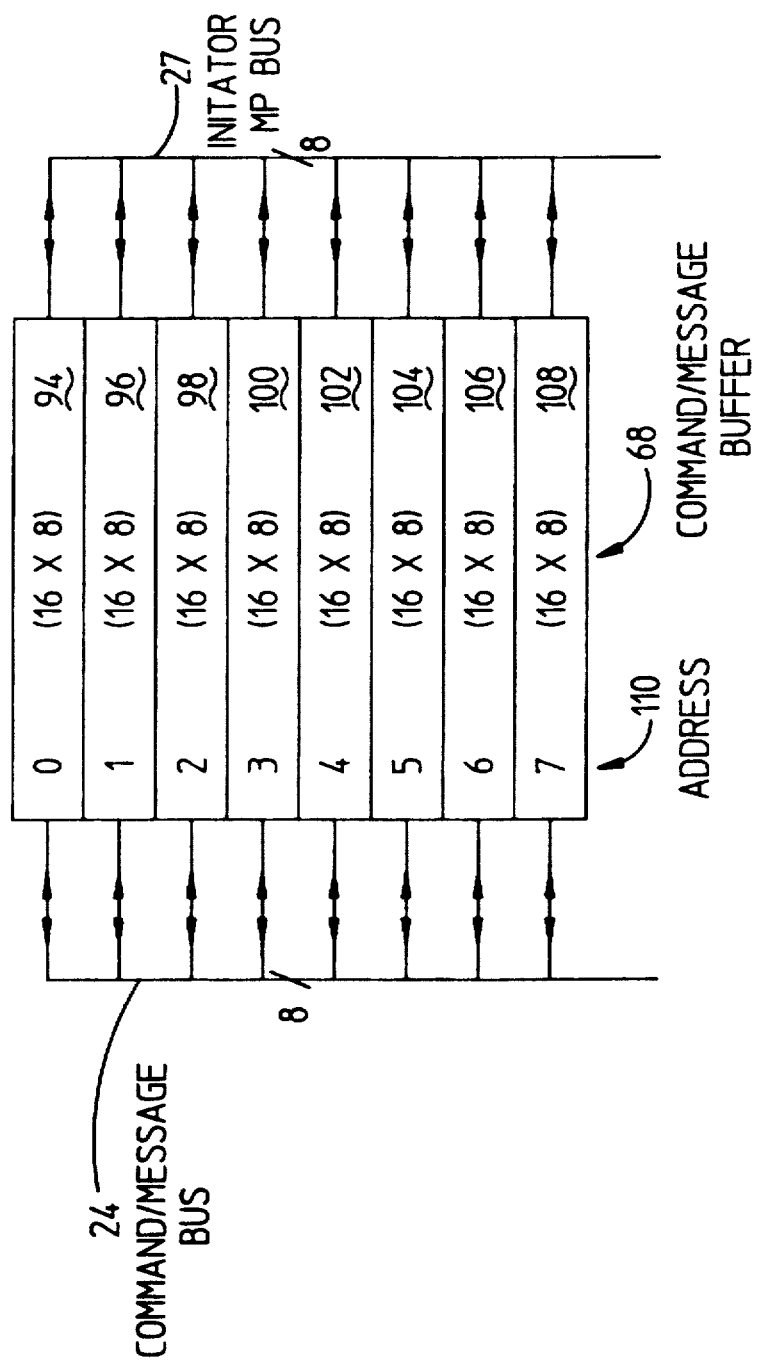
FIG. 5 is a schematic diagram of the Command/Message Buffer.

FIG. 5 is a schematic illustration of the manner in which the command/message buffer 68 is implemented in accordance with the present invention. The command/message buffer 68 comprises Random Access Memory (RAM) which is organized as 128 8 bit bytes. The RAM is logically divided into 8 pages 94, 96, 98, 100, 102, 104, 106, 108 which are each 16 bytes long. Each page is assigned an address 110 that ranges from 0 to 7. These addresses correspond directly to SCSI addresses. Hence, an initiator at address 5 would always have its identity and status information placed in page 104. Similarly, a target at address 5 would always have identify and command information placed in page 104.

The pages are special in that they act as a message buffer for both the initiator and the target, and as a status buffer for the initiator and a command buffer for the target. The command/message buffer 68 is coupled to the command/message bus 24 and the initiator microprocessor bus 27. It enables commands and messages to be stored so that microprocessor interrupts by microprocessor 32 (FIG. 2) are not required for each command or message that is received or transmitted by initiator 10.

FIG. 6 is a schematic diagram indicating the typical transaction sequencing states of the bus 12, illustrated in FIG. 1, that constitute the preferred performance path. Each of the circles indicates a SCSI bus phase, while each of the smaller rectangles indicates a processor intervention with a description of the intervention that is required. Each of the lines with arrows indicates the path that is taken by the initiator controller of the present invention without an interrupt. As disclosed in FIG. 6, the process is started by the initiator selecting a target and sending a command as indicated by reference numeral 112. This step may comprise the individual steps of configuring registers in the initiator 10 at step 114 to send a command to write data to a target, such as target number 14, and indicate to DMA controller 36 the quantity of data to be sent and the location to where the data is to be sent. The initiator controller 20 then attempts to win the bus through arbitration, as indicated by 116. Initiator controller 20 then selects the target at 118, such as target number 14, and the selected target asserts the proper control lines to recognize that it has been selected by the initiator controller 20. At the Message-Out, Identify phase 120, the initiator controller 20 recognizes the control lines that have been asserted by the target controller, such as target controller 42 of target number 14, as a request for a Message-Out. The initiator controller 20 automatically places data on the bus from registers that have been configured at step 114. This data comprises an Identify message which identifies a particular logic unit number within the target 14. At the command phase 122, the initiator controller 20 places command bytes on the bus which comprise a command to direct the target to perform a function such as to read, write, run a diagnostic, etc. For purposes of illustration, the command to target 14 may be to send Write data from initiator 10. The command is transferred from C/M buffer 68 onto the SCSI bus 12, as illustrated in FIG. 3. After this occurs, the target may determine that it is not prepared to receive the data and decides to disconnect at 124. The target then sends a message to initiator controller 20 indicating that it is disconnecting from the bus. The bus is then in the bus-free state 128. At this point, the process can be repeated by the initiator selecting another target and sending a command at 112, as indicated by path 130, or a target can reselect, as indicated by 132. When a target reselects the initiator, as indicated by reselection 134, whether it is the same target, which will be referred to as target A (in the present example, target 14) or a different target, which will be referred to as target B, it will assert a Message-In signal at 136 to identify itself to initiator controller 20 as the target that has reselected the bus. The transaction sequence then proceeds, via path 138, to one of three choices. The first choice, as indicated by path 140, is that the same target (Target A) that was identified at step 120 has reselected and continues the process of receiving Write data from the initiator controller 20, as indicated at step 142. The data is then transferred either in or out of the target at step 144. In this instance, target 14 continues the process of receiving Write data from initiator controller 20.

The second alternative, as indicated by path 146, is that another target (target B) has reselected at step 134 and starts the process of transferring data at 148. As indicated in the description of FIGS. 3 and 4, data is left resident in FIFO 64 which must be stored in order to prevent overwriting and loss of the data since a different target, target B, has reselected and wishes to transfer data into FIFO 64. Consequently, the only required interrupt of this system is introduced at step 150 wherein the microprocessor is interrupted to reconfigure the DMA controller 36 and to manage the FIFO resources so that the data which is left resident in FIFO 64 is not lost. Once this step is completed, data is transferred in or out of target B. In the present case, Read data is transferred from target B to initiator controller 20.

The third alternative indicated by path 154 is that any target that reselects sends Status and Command Complete messages as indicated at 156. The target that has reselected, whether it is target A or target B, then sends a Status signal at 158 and a Message-In at 160 that the command is complete. This occurs without any interrupts of the microprocessor 32 since status and messages can be automatically stored in the C/M buffer 68. If either the same target or a different target reselects and goes to a data phase as indicated by path 140 or 146, the target can transition to send a Save Pointers and Disconnect message, as indicated at 162, or send Status and Command Complete messages, as indicated at 156. When the target transitions to Save Pointers and Disconnect 162, the target, whether it be a same target (target A) or a different target (target B), sends a Message-In at 164 to the initiator controller 20 to Save Pointers in RAM 34 and thereby indicate last data that was sent or received. The target then sends a Message-In at 166 to the initiator controller 20 that the target is disconnecting from the bus. The bus then goes to a bus free state 128 via path 168. As indicated by path 170, after the initiator selects a target and sends a command, as indicated by 112, either the same target (target A), which was identified at step 120 can go directly to a Data In state or another target (target B) can go to a Data In state. In this case, either path 140 or 146 would be followed in the same manner as described above.

Figure 7:
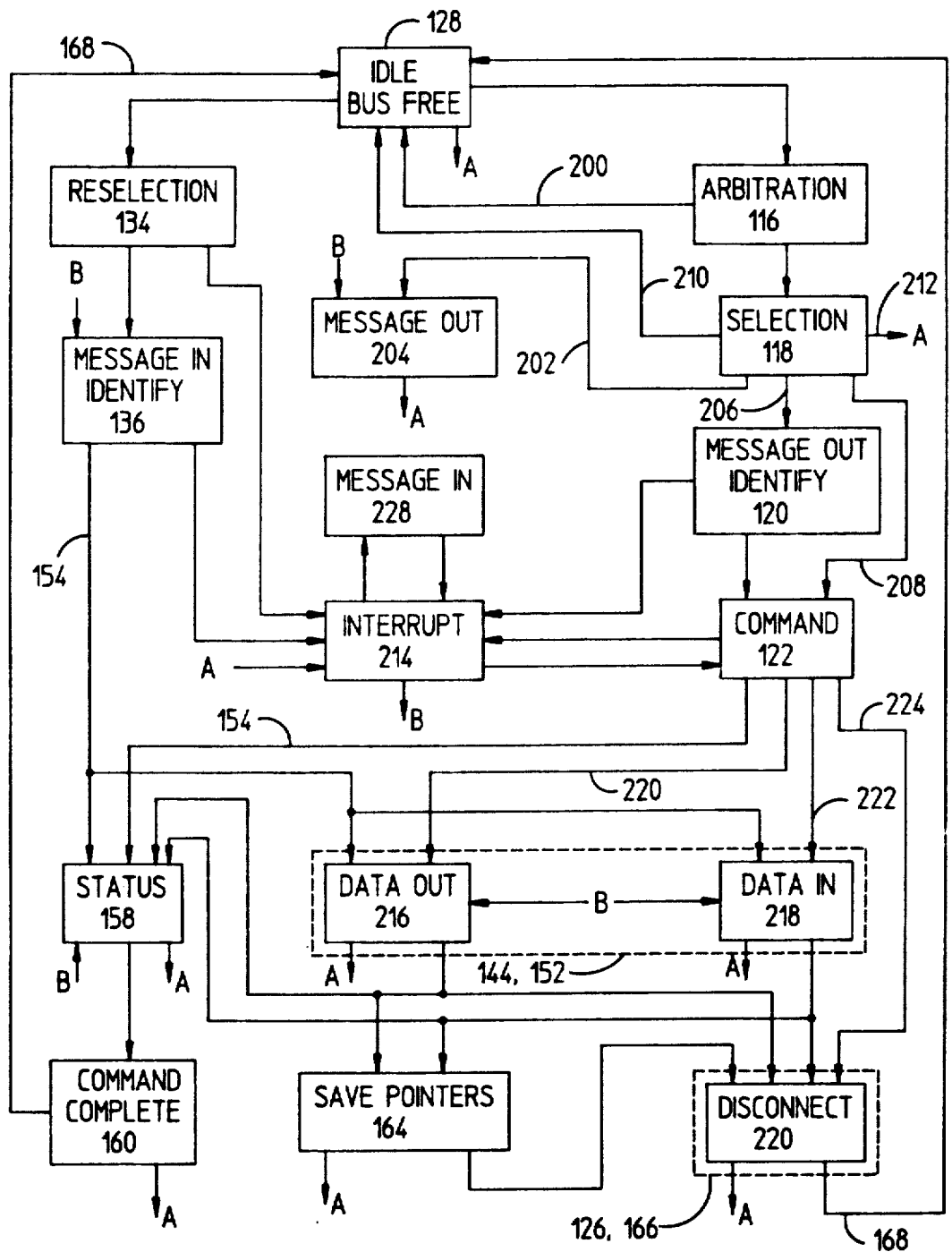
FIG. 7 is a state diagram illustrating all possible states and all possible sequences between states in a SCSI bus system.
Figure 8:
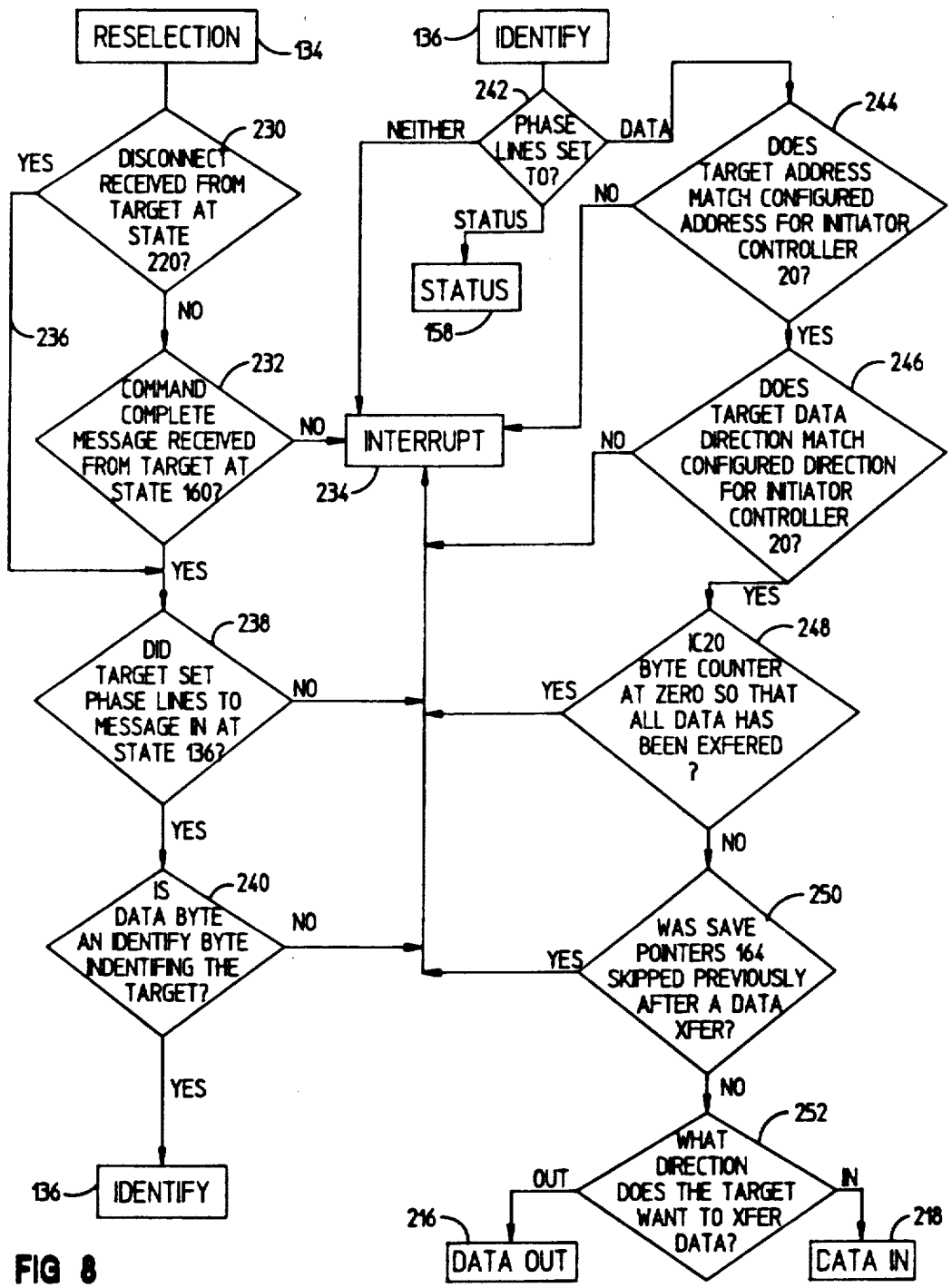

FIG. 7 is a state diagram that illustrates all the possible states and all possible sequences between states in a typical SCSI bus, whereas FIG. 6 illustrates a preferred performance path sequence of a SCSI-bus and initiator controller 20. Hence, the numbering between FIG. 6 and FIG. 7 corresponds to the various states of the bus, as well as the transitions between states as indicated by the lines.

As illustrated in FIG. 7, the initiator controller 20 transitions from bus free state 128 to the arbitration state 116, as previously described in FIG. 6. If the initiator controller 20 wins arbitration, it will sequence automatically to Selection 118. If the initiator controller 20 does not win the arbitration, it will sequence back to the bus free state 128 via transaction sequence 200.

From the selection state 118, the target takes control of the bus. If the initiator controller 20 has asserted the attention signal to tell the target it wants to send a Message Out, the bus will sequence to the Message Out state 204, via transaction sequence 202, or to Message Out-Identify state 120 via transaction sequence 206. Message Out state 204 indicates a unique Message Out signal sent from the initiator controller 20 to the target, such as, for example, synchronous negotiation bytes which indicate the negotiated number of bytes that can be stored in the synchronous stack and information regarding the speed that which the bytes are to be transmitted. If the target transitions from Selection state 118 to the Message Out Identify state 120, a single identify byte, which comprises a portion of the address signal, is sent from the initiator controller to identify the logical unit number within the target that has been selected. If, on the other hand, the attention signal has not been asserted by initiator controller 20, it will sequence directly to Command state 122 via state transition 208 so that the Message Out-Identify state 120 is averted. The initiator controller 20 can also sequence from the Selection state 118 via state transition 210 into the idle or bus free state 128, if the target does not respond to selection because it is either dead or does not exist. Additionally, initiator controller can sequence from the Selection state 118 directly to Interrupt via state transition 212.

In the Message Out-Identify state 120, initiator controller 20 can either sequence directly to Interrupt 214, or to Command state 122. In Command state 122, as described in the description of FIG. 6 above, command bytes are sent by the initiator controller 20 to indicate to the target the particular function which the target is intended to perform such as reading data, writing data, etc. From the command state 122, the initiator controller 20 can sequence directly to Status state 158 via state transition 154, Data-Out state 216 via state transition 220, Data-In/state 218 via state transition 222, or Disconnect 220 (corresponding to Disconnects 126 and 166 of FIG. 6) via state transition 224. In each case, the target has chosen to transition to Status, Receive Data, Send data, or Disconnect, respectively. From both the Data-Out/state 216 and Data In/state 218 the initiator controller 20 can sequence to interrupt 214. From both the Data-Out/state 216 and Data In/state 218 the initiator controller 20 can sequence directly to Disconnect 220 or to Save Pointers state 164, then to Disconnect state 220. The initiator controller 20 cycles directly from the Data-Out/state 216 and the Data In/state 218 directly to the Disconnect state 220 and cycles around the Save-Pointers state 164 at the end of a data transfer so that no Save Pointers message is required. From the Disconnect state 220 the initiator controller 20 sequences either to Idle/Bus Free state 128, via state transition 168, or to Interrupt 214. From the Data-Out/state 216 and Data-In/state 218 the initiator controller can also cycle directly to Status state 158. From the Status state 158, the initiator controller 20 cycles to the Command Complete state 160, as previously described in FIG. 6, and then to the Idle/Bus-Free state 128 via state transition 168. From the status state 158, the initiator controller can also sequence directly to the Interrupt state 214.

From the Bus-Free state 128, the initiator controller 20 can also sequence to the Reselection state 134 and subsequently to either interrupt state 214, or Message-In Identify state 136, as described in FIG. 6. From Message-In, Identify state 136 the initiator controller 20 can sequence either to the Interrupt state 214, or Data in or Data out or directly to status 158 via state transition 154, as described with respect to FIG. 6 above. From the interrupt state 214, the initiator controller 20 can sequence to the Message-In, Identify state 136, Status state 158, Data-Out/state 216, Data-In/state 218, or the Command state 122. Initiator microprocessor 32 keeps track of the phase lines and can, consequently, direct the initiator controller 20 to go to any of the states indicated in FIG. 7. From Interrupt state 214, the initiator controller 20 can also transition to Message-In/state 228, which represents a message that is received by the initiator controller 20 that the initiator controller 20 is not programed to handle in an automated manner, as shown in the typical performance path illustrated in FIG. 6. Microprocessor 32, in that case, is always interrupted upon receipt of such a message.

FIG. 8 is a logic flow diagram of the decisional processes of the initiator controller 20 at the Reselection state 134 and Message-In, Identify state 136, as illustrated in FIG. 6. As shown in FIG. 8, at the Reselection state 134 the initiator controller 20 first determines whether a Disconnect message has been received from a target at Disconnect state 220, as illustrated by decisional block 230. If Disconnect message has not been received from the target, the initiator controller 20 then determines whether a Command Complete message has been received from the target at state 160, as indicated by decision block 232. If the Command Complete message has not been received and the Disconnect message has not been received from the target, the target is not following the preferred performance path illustrated in FIG. 6 and the initiator controller 20 cycles to Interrupt 234.

If a Disconnect message is received from the target, after Reselection, as indicated by path 236, initiator controller 20 then determines whether the target has set the phase lines for Message-In at state 136, as indicated by decisional block 238. If the target has not set the phase lines, to Message-In then the initiator controller 20 cycles to Interrupt 234 because the target is not following the preferred performance path illustrated in FIG. 6. If the target has set the phase lines to Message In/state 136, the circuit then determines whether the byte that is on the data line is an identify byte of data that identifies the target as indicated by decisional block 240. If it is not an identify byte, the initiator controller 20 cycles to an interrupt at 234. If it is an identify byte, initiator controller 20 cycles to Message-In, Identify state 136.

In the Message-In, Identify state 136 the initiator controller 20 then determines how the target has set the phase lines at decision block 242. If the phase lines are set by the target to Status, the initiator controller 20 sequences directly to Status state 158. If the phase lines are not set to either Status or Data transfer then the initiator controller cycles to Interrupt 234. If the phase lines are set to Data transfer, then the initiator controller determines whether the SCSI target identification and logical unit number of the target that has been reselected, matches the SCSI identification and logical number that the initiator controller 20 has been configured to transfer data to or from automatically. If these do not match, the initiator controller 20 cycles directly to Interrupt 234. If these do match, initiator controller 20 then determines, at decisional block 246, whether the direction that the target desires to transfer data matches the direction that the initiator controller 20 is configured to transfer data. If these two do not match, the initiator controller cycles directly to interrupt 234. If these directions match, the initiator controller 20 then determines, at decisional block 248, whether the initiator controller byte counter has counted down to zero, indicating that all of the data has been transferred. If the byte counter has counted to zero, the initiator controller 20 cycles directly to interrupt 234. If the byte counter has not cycled to zero and initiator controller 20 determines, at decisional block 250, whether the Save-Pointers state 164 was a previous state that was skipped after a data transfer, indicating that a final transfer of data occurred previously. If the Save-Pointer state was skipped after a data transfer, the initiator controller 20 cycles directly to interrupt 234. If not, the initiator controller 20 then determines the direction in which the target desires to transfer data, at decisional block 252. If the target desires to transfer data out it cycles to Data-Out state 216. If the target desires to transfer data in, the initiator controller 20 cycles to Data-In state 218. The present invention therefore provides a unique system for minimizing processor interrupts in a SCSI bus system by utilizing a command message buffer which is capable of automatically storing commands, status and messages without microprocessor interrupts. The present invention also utilizes a combination FIFO/Synchronous stack storage device which is capable of storing data that would otherwise overwrite data left resident in the initiator controller FIFO. The system allows for high speed synchronous transmission of data by providing a sufficiently large synchronous stack storage register that is capable of storing a negotiated number of bytes that is greater than or equal to the number of bytes that are transmitted during high speed synchronous transmission delays. Each of these enhancements substantially reduces the overall response time of the system, especially in virtual memory systems where data storage devices must be frequently accessed.

The foregoing description of the invention has been presented for purposes of illustration and description. It is not intended to be exhaustive or to limit the invention to the precise form disclosed, and other modifications and variations may be possible in light of the above teachings. For example, the present invention was described in relationship to a SCSI bus system but could equally as well be implemented in any bus system to eliminate or minimize interrupts. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

We claim:

1. A process for minimizing processor interrupts in an initiator having a processor and an initiator controller, and wherein the initiator is coupled to at least first and second targets by a commonly shared computer bus system, the process comprising the steps of:

automatically sequencing through transaction states of said bus until a transfer of data from said initiator to said first target is temporarily suspended and said second target reselects the bus;

interrupting said processor of said initiator only when said second target sequences to a data transfer state after said transfer of data from said initiator to said first target has been temporarily suspended and said second target has reselected the bus;

storing a predetermined number of bytes transferred to said initiator from said second target in a synchronous stack register in said initiator controller to prevent any remaining data to be transferred from said initiator to said first target that resides in a FIFO in said initiator controller from being overwritten;

transferring said remaining data to be transferred to said first target to a predetermined location different from the FIFO;

transferring the data stored in said synchronous stack register to said FIFO after said remaining data to be transferred to said first target has been transferred to said predetermined location;

proceeding with said transfer of data from said second target to said initiator.

2. The process of claim 1 wherein said step of storing said data in a predetermined location comprises storing said data in RAM associated with said processor of said initiator.

3. The process of claim 1 wherein said step cf storing said data in a predetermined location comprises storing said data via DMA of said initiator.

4. The process of claim 1 wherein said step of storing said data in a predetermined location comprises:

determining the number of bytes in said FIFO;

resetting pointers in RAM of said initiator to correspond with the number of said bytes in said FIFO.

5. The process of claim 1 further comprising the steps of:

negotiating said predetermined number of bytes from said second target to a number that is greater than the number of bytes that are received by said initiator during a delay between receipt of a byte by said initiator and receipt of an acknowledge signal by said second target indicating receipt of said byte, and less than the number of bytes that can be stored by said synchronous stack register.

6. The process of claim 1 wherein each target has an identification number associated therewith, further comprising the steps of:

configuring the initiator controller with the identification number of one of said targets;

comparing the identification number configured in the initiator controller to the identification number of the second target;

storing said predetermined number of bytes in said synchronous stack register whenever the result of the comparison indicates that said identification numbers do not match;

storing said predetermined number of bytes in said FIFO whenever the result of the comparison indicates that said identification numbers do match.

7. The process of claim 1 wherein the step of transferring data from said synchronous stack register to said FIFO is performed while data is incoming from said second target to said synchronous stack register.

8. A data storage system for preventing loss of data in an initiator having an initiator controller, and wherein the initiator is coupled to a computer bus system that is shared by the initiator and at least first and second targets, the data storage system comprising:

FIFO storage means for storing Write data to be transmitted by said initiator controller to the first target;

synchronous stack storage means for storing Read data that is received by said initiator controller from the second target after said first target disconnects from said computer bus system prior to completion of transmission of said Write data from said initiator to said first target;

logic means responsive to logic control signals for transmitting said Write data to said FIFO storage means, for transmitting Read data to said synchronous stack storage means that is received by said initiator controller form the second target after said first target disconnects from said computer bus system prior to completion of transmission of said Write data from said initiator to said first target, and for transferring Read data stored in said synchronous stack storage means to said FIFO storage means after said Write data is read from said FIFO storage means;

synchronous stack clock means for clocking said Read data into said synchronous stack storage means.

9. A process for minimizing processor interrupts in an initiator having a processor and an initiator controller, and wherein the initiator is coupled to at least first and second targets by a computer bus system, the process comprising the steps of:

automatically sequencing through transaction states of said bus, including transferring Write data from said initiator to the first target via a FIFO in the initiator controller, until the first target temporarily suspends the Write data transfer and the second target, having Read data to be transferred to the initiator, reselects the bus;

interrupting, from the second target, said processor said initiator only after said second target sequences to a Read data transfer state and only after said transfer of Write data from said initiator to said first target has been temporarily suspended and said second target has reselected the bus;

transferring and storing a predetermined number of bytes of Read data from said second target to a synchronous stack register in said initiator controller;

storing any Write data remaining in said FIFO in a remote predetermined location;

transferring Read data stored in said synchronous stack register to said FIFO only after said Write data remaining in said FIFO has been stored in said remote predetermined location;

proceeeding to complete said transfer of said Read data from said second target to said initiator;

wherein any Write data remaining in the FIFO when the first target temporarily suspends Write data transfer is not overwritten or lost when the second target reselects the bus and transfers Read data to the initiator via the initiator controller.

10. The process of claim 9 wherein said step of storing said Write data in a remote predetermined location comprises storing said Write data in a RAM associated with said processor of said initiator.

11. The process of claim 9 wherein said step of storing said Write data in a remote predetermined location comprises storing said Write data via a DMA cycle of said initiator.

12. The process of claim 9 wherein said step of storing said Write data in a remote predetermined location comprises:

determining the number of bytes of Write data stored in said FIFO;

resetting pointers in RAM of said initiator to correspond with the number of said bytes in said FIFO.

13. The process of claim 9 wherein said initiator and said second target communicate with each other to define a negotiation therebetween further comprising the steps of:

negotiating between said initiator and said second target for said predetermined number of bytes to be transferred from said second target to obtain a number of bytes that is greater than the number of bytes that are received by said initiator during a delay between receipt of a byte by said initiator and receipt of an acknowledge signal by said second target indicating receipt of said byte, and less than the number of bytes that can be stored by said synchronous stack register.

14. The process of claim 9 wherein each target has associated therewith a target identification number for providing the identity thereof to the initiator and said step of storing a predetermined number of bytes in a synchronous stack register comprises the steps of:

comparing the target identification numbers of said first target and said second target;

storing said predetermined number of bytes in said synchronous stack register whenever said target identification numbers do not match.

15. The process of claim 9 wherein the step of transferring Read data from said synchronous stack register to said FIFO is performed while Read data is incoming from said second target to said synchronous stack register.

16. A data storage system for preventing loss of data in an initiator having an initiator controller, and wherein the initiator is coupled to a computer bus system, the data storage system comprising:

FIFO storage means for storing Write data to be transmitted by said initiator controller to the first target;

synchronous stack storage means for storing Read data that is received by said initiator controller from the second target after said first target disconnects from said computer bus system prior to completion of transmission of said Write data from said initiator to said first target;

logic means responsive to logic control signals for normally transmitting said Write data from said FIFO storage means to said first target, for transmitting Read data to said synchronous stack storage means that is received by said initiator controller from the second target after said first target disconnects from said computer bus system prior to completion of transmission of said Write data from said FIFO storage means to said first target, for transferring to a remote memory location and Write data remaining in said FIFO storage means after said first target disconnects from the bus prior to completion of transmission of said Write data to said first target, and for transferring Read data stored in said synchronous stack storage means to said FIFO storage means to said remote memory location;

synchronous stack clock means for clocking said Read data into said synchronous stack storage means;

whereby any write data remaining in the FIFO when the first target disconnects is not overwritten or lost when the second target transfers Read data to the initiator controller.

* * * * *